(12) United States Patent
Ohmayer et al.

(10) Patent No.: US 7,168,315 B2
(45) Date of Patent: Jan. 30, 2007

(54) LEVEL METER

(75) Inventors: Gerd Ohmayer, Haslach (DE); Holger Gruhler, Tuningen (DE); Joern Jacob, Wolfach-Kirnbach (DE)

(73) Assignee: Vega Grieshaber KG, Wolfach (DE)

( * ) Notice: Subject to any disclaimer, the term of this patent is extended or adjusted under 35 U.S.C. 154(b) by 111 days.

(21) Appl. No.: 11/106,453

(22) Filed: Apr. 15, 2005

(65) Prior Publication Data

US 2005/0229697 A1 Oct. 20, 2005

(30) Foreign Application Priority Data

Apr. 16, 2004 (DE) ...................... 10 2004 019 228

(51) Int. Cl.
*G01F 23/00* (2006.01)
(52) U.S. Cl. ................................. 73/290 V; 73/290 R
(58) Field of Classification Search .............. 73/290 V, 73/290 R
See application file for complete search history.

(56) References Cited

U.S. PATENT DOCUMENTS

| 3,495,102 A | * | 2/1970 | Hans et al. ................. 310/338 |
| 4,594,584 A | * | 6/1986 | Pfeiffer et al. .............. 340/620 |
| 5,191,316 A | * | 3/1993 | Dreyer ........................ 340/621 |
| 5,247,832 A | * | 9/1993 | Umezawa et al. ........ 73/290 V |

(Continued)

FOREIGN PATENT DOCUMENTS

DE    36 25 779 C2    2/1988

(Continued)

*Primary Examiner*—Hezron Williams
*Assistant Examiner*—Rodney Frank
(74) *Attorney, Agent, or Firm*—Nath & Associates, PLLC; Gregory B. Kang; Derek Richmond

(57) ABSTRACT

The invention relates to a level meter (1) with an outer oscillating body (3) and an inner oscillating body (4), which bodies are coaxially positioned relative to a longitudinal axis (X), with a drive and reception device (7) for exciting an oscillation in the oscillating bodies or for detecting an oscillation in the oscillating bodies, with a diaphragm (61) for elastically coupling one of the oscillating bodies (3), and with a clamping device (8) for clamping the drive and/or reception device (7) against the oscillating bodies. The level meter is advantageously characterized by the diaphragm (61), which runs in a lateral direction relative to the longitudinal axis (X) of the outer oscillating body (3) and on the outside passes into a transitional element (5, 51), said transitional element (5) being positioned between the drive and/or reception device and the inner oscillating body for the purpose of transmitting the oscillations between the drive and/or reception device and the inner oscillating body, and said transitional element (5) running in part, with one wall (54), in a lateral direction adjacent to the diaphragm (61); the clamping device, which clamps the diaphragm (61) and the drive and/or reception device in such a way that the drive and/or reception device is clamped against the transitional element; and a gap (s) between the adjacent walls (63, 54) of the diaphragm (61) and of the transitional element (51). The design and dimensions of the gap permit the free oscillation of the diaphragm vis-a-vis the transitional element. At the same time, when strong lateral displacing forces are exerted on the outer oscillating body, the diaphragm will come up against the adjacent wall due to the smaller dimensions of the gap, with the result that a plastic deformation of the diaphragm is avoided. Also prevented is the disengagement of the drive and/or reception device.

10 Claims, 1 Drawing Sheet

U.S. PATENT DOCUMENTS

Figure 1:
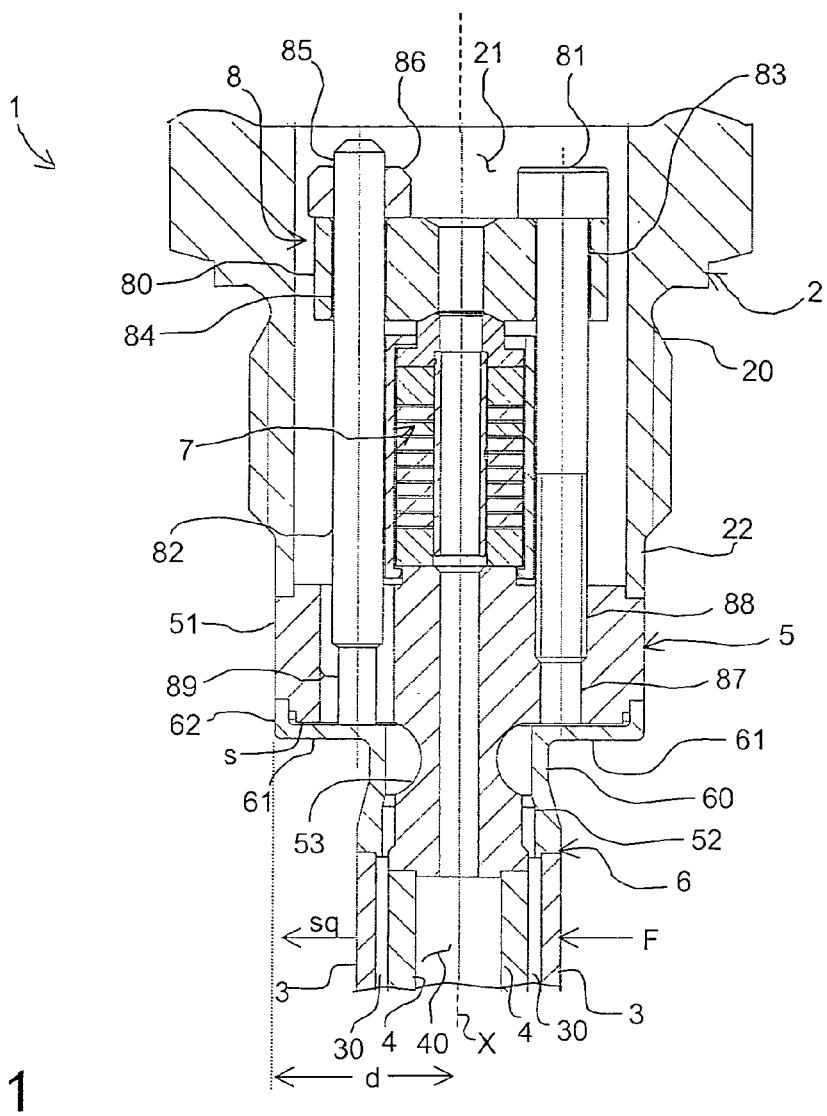

| | | | | |
|---|---|---|---|---|
| 5,408,168 | A | * | 4/1995 | Pfandler ..................... 318/642 |
| 5,709,558 | A | * | 1/1998 | Dreyer et al. ................. 439/95 |
| 6,644,116 | B2 | * | 11/2003 | Getman et al. ........... 73/290 V |
| 7,043,981 | B2 | * | 5/2006 | Kuhny et al. .............. 73/290 V |
| 2005/0034521 | A1 | * | 2/2005 | Lopatin ....................... 73/649 |

FOREIGN PATENT DOCUMENTS

| | | |
|---|---|---|
| DE | 41 18 793 C2 | 12/1992 |
| DE | 42 03 715 C2 | 8/1993 |

* cited by examiner

LEVEL METER

The invention relates to a level meter with the features of the preamble of patent claim 1 or 2.

Known from DE 38 08 481 C2 is a level meter with a housing and two tube-shaped, coaxially positioned oscillating bodes. In the inside of these oscillating bodies there is positioned perpendicular to the longitudinal direction a drive and reception device for exciting the oscillating bodies into oscillation and for detecting an oscillation executed by the oscillating bodies.

Known from DE 42 01 360 C2 is a level meter with an outside oscillating body and an inside oscillating body, such that the oscillating bodies, in the form of oscillating rods separated from each other by a certain distance, are secured to the diaphragm of a housing. The oscillating bodies project through the diaphragm into the interior of the housing. Inside of the housing is a drive and reception device positioned perpendicular to the longitudinal axis of the oscillating bodies. The drive and reception device is secured directly to the back section of one of the oscillating bodies by means of a facing. In order to fix the drive and reception device between the two back sections of the oscillating bodies under a pre-adjustable tension, the configuration exhibits a clamping device for positioning the drive and reception device against the back sections of the oscillating bodies. The clamping device consists of a screw which is screwed into a through-hole with an inner thread and which is located in the back section of the other oscillating body, such that the point of the screw is fixed against the second face of the drive and reception device. This configuration eliminates the eventuality arising when the drive and reception device becomes disengaged, and is thus put out of operation, because a lateral displacing force is exerted on the outside section of one of the oscillating bodies and moves laterally toward the other oscillating body. Such displacing forces arise when bulk material coming from the side presses against one of the oscillating bodies in the direction of the other oscillating body.

The goal of the invention is to improve a level meter with an outside and inside oscillating body with respect to the position of the drive and/or reception device, such that a disengagement of the drive and reception device will be avoided when displacing forces are acting laterally on the outside oscillating body.

This goal is achieved in a level meter with the features of patent claim 1 and claim 2.

According to an initial independent embodiment, therefore, a level meter is preferred which exhibits an initial oscillating body and a second oscillating body, which bodies are coaxially positioned relative to a longitudinal axis; a drive and reception device for exciting an oscillation in the oscillating bodies; and a diaphragm for elastically coupling one of the oscillating bodies, such that the diaphragm, on its side facing away from the oscillating bodies, rests in a position that is separated from a transitional element by a gap, and such that the gap is sufficiently small for the diaphragm to push against the transitional element if said diaphragm is displaced over a given path or distance.

According to a second independent embodiment, therefore, a level meter is preferred which exhibits an outer oscillating body and an inner oscillating body, which bodies are coaxially positioned relative to a longitudinal axis; a drive and reception device for exciting an oscillation in the oscillating bodies, or for detecting an oscillation in the oscillating bodies; a diaphragm for elastically coupling one of the oscillating bodies; and a clamping device for clamping the drive and/or reception device against the oscillating bodies. The level meter is advantageously characterized by the diaphragm, which extends in a lateral direction relative to the longitudinal axis of the outer oscillating body and on the outside passes into a transitional element; by the transitional element, which is positioned between the drive and/or reception device and the inner oscillating body for the purpose of transmitting the oscillations between the drive and/or reception device and the inner oscillating body, and which runs in part, with one wall, in a lateral direction adjacent to the diaphragm; by the clamping device, which clamps the diaphragm and the drive and/or reception device in such a way that the drive and/or reception device is clamped against the transitional element; and by a gap (s) between the adjacent walls of the diaphragm and of the transitional element.

Advantageous elaborations are the subject matter of dependent claims.

A level meter is preferred in which the clamping device exhibits a clamping bolt which runs from the diaphragm to a clamping element and which, at the back, clamps this clamping element against the drive and/or reception device in such a way that the drive and/or reception device is set against the inner oscillating body at the front and against the outer oscillating body at the back.

A level meter is preferred exhibiting this kind of clamping device, in which the clamping bolt runs through a clamping bolt through-hole in the transitional element.

A level meter is preferred in which the gap width has dimensions such that a displacing force exerted laterally on the outside oscillating body swings the outside oscillating body in a lateral direction and thereby presses the wall of the diaphragm toward the gap and against the adjacent wall of the transitional element.

Preferred is a level meter, in which the gap width has dimensions such that the wall of the diaphragm rests against the wall of the transitional element before plastic deformation occurs in the diaphragm.

Preferred is a level meter in which the gap width has dimensions such that the wall of the diaphragm rests against the wall of the transitional element before the clamping device, specifically a clamping bolt and a clamping element belonging to the clamping device, disengage the drive and/or reception device at the back to a degree such that the transmission of oscillations between the drive and/or reception device and at least of the oscillating bodies is interrupted and/or disturbed.

A level meter is preferred in which the gap width is smaller than or equal to 3 mm, specifically smaller than or equal to 2 mm.

A level meter is preferred in which the ratio between the gap width and the radius of the diaphragm is smaller than or equal to 1:45, specifically smaller than or equal to 1:72.

A level meter is preferred in which the configuration of the diaphragm and/or the gap has a circular and cylindrically symmetrical design relative to the longitudinal axis.

Figure 2:
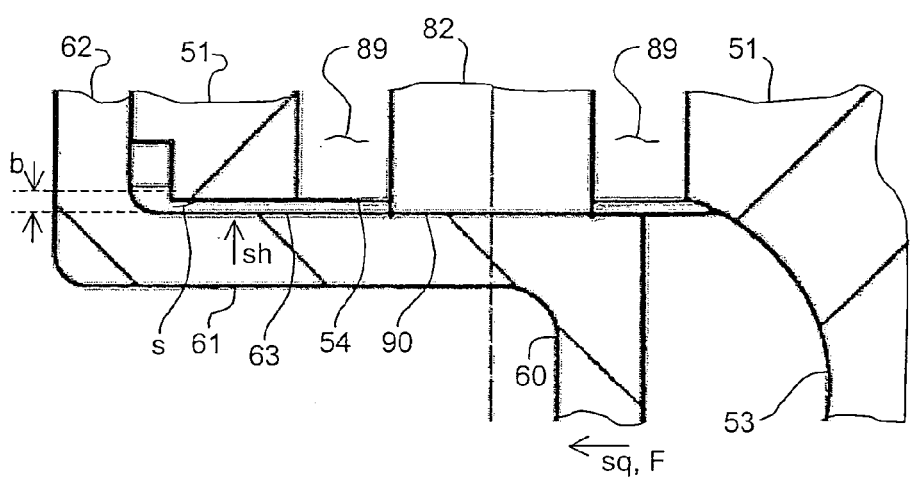

An exemplary embodiment is next described in greater detail on the basis of the drawing. Shown are:

FIG. 1: a partial section view through a level meter with two oscillating bodies positioned coaxially on a housing FIG. 2: a sectional enlargement of the level meter according to FIG. 1 depicting the transitional area between a diaphragm and a transitional element As can be seen from FIGS. 1 and 2, a level meter 1 comprises a plurality of individual components. The depicted level meter 1 has a coaxial design relative to the longitudinal axis X, such that the basic concept can be applied to other cylindrical cross-sections. In order to simplify the description, "front" or "forward" components and elements will be understood as running in the direction of the outside end of the oscillating bodies, i.e., toward a point of measurement. "Lateral" or "transverse" elements and forces are understood to run on a plane perpendicular to the longitudinal axis.

The level meter 1 exhibits a housing 2, which serves to receive and secure the other components. On the outer circumference the housing 2 exhibits a screw-in thread 20, by means of which the housing 2 can be screwed into a threaded hole in the container. When screwed into a container, the housing 2 projects with its front section into the interior of the container, along with the oscillating bodies 3, 4 attached to the housing 2, in order to monitor the level of fill in the container. The back section of the housing 2 projects outside of the container wall and provides access from behind to components in an interior 21 of the housing 2, particularly to electrical connections, which are not depicted, for operating the level meter 1.

On the front the circumferential wall 22 of the housing 2 is secured, specifically welded, to a transitional fastening element 5. The transitional fastening element 5 consists of a back section 51 that ideally is disk-shaped; the housing 2 is secured to the back of this section 51. The transitional fastening element 5 also consists of a front section 52, which protrudes from the back section 51 in the forward direction. The inner oscillating body 4 of the two oscillating bodies is attached, specifically welded, to the forward end of the front section 52 of the transitional fastening element 5. In order to improve the oscillatory transmission and the elastic properties, the transitional fastening body 5 exhibits a narrowed area 53, with only a thin wall, in the transitional area between the back section 51 and the front section 52. The outer circumference of the front section 52 of the transitional fastening body 5 will be smaller than or equal to the outer diameter of the inner oscillating body 4.

The transitional fastening body 5 may be optionally designed as a single-piece, forward component of the housing 2.

The inner oscillating body 4 is tubular in shape and with its interior 40 is positioned concentrically around the longitudinal axis X of the level meter 1. The outer oscillating body 3 of the two oscillating bodies is also tubular in shape and with its interior 30 is also positioned concentrically around the longitudinal axis X. The diameter of the interior 30 of the outer oscillating body 3 is such that a free space remains between the inner wall of the outer oscillating body 3 and the outer wall of the inner oscillating body 4. This free space is wide enough for the two oscillating bodies 3, 4 not to come into contact, even in an oscillating state.

The back end of the outer oscillating body 3 is secured, specifically welded, to a diaphragm fastening body 6.

The diaphragm fastening body 6 runs rearwards from the outer oscillating body 3 to the transitional fastening element 5; its back end is secured, specifically welded, to the outside forward circumferential section of the transitional fastening element 5. The front section 60 of the diaphragm fastening body 6 is basically tubular in shape and has a wall thickness that, at least in portions, is thin enough to form an elastic transitional section for supporting the oscillating movement of the outer oscillating body 3. At the back, the front section 60 of the diaphragm fastening body 6 passes into a section running in a lateral direction. This laterally extending section forms the actual diaphragm 61, which is designed as an element for coupling the outer oscillating body 3 to the transitional fastening element 5. The outer circumference of the diaphragm 61 passes as a single piece into a fastening collar 62 running in the longitudinal direction, i.e., coaxial to the longitudinal axis X. The back face of the fastening collar 62 is secured to the transitional fastening element 5.

To permit the free oscillation of the outer oscillating body 3 relative to the transitional fastening element 5, a back wall 63 that belongs to the diaphragm 61 and faces the housing 2 is positioned at a distance from an adjacent front wall 54 belonging to the transitional fastening element 5, with the result that a gap s remains between the two. The gap width b of the gap s is wide enough for the two adjacent walls 63, 54 of the diaphragm 61 and the transitional fastening element 5 not to touch in the course of operation under normal measuring conditions.

According to initial tests, for a typical level meter 1 a gap width b smaller than or equal to 0.2 mm is sufficient. For this level meter 1 the diaphragm 61 extends from the outer circumference of the outside oscillating body 3 in a lateral direction. In this embodiment the ratio of the lateral extent of the diaphragm—or the radius d of the diaphragm, which will ideally be 14.5 mm—to the gap width b will advantageously equal 1:72 in an initial optimized design. In another, less optimized design with a gap width b of 0.3 mm the ratio is 1:48. These ratios apply for structures realized in tests, for which reason the realization of other, also advantageous ratios is possible, given modified radii, materials, or gap widths.

At the back of the configuration a drive and reception device 7 is positioned on the back section 51 of the transitional fastening element 5. The drive and reception device 7—or optionally only a drive device or only a reception device—runs coaxially around the longitudinal axis X and will ideally exhibit a plurality of piezoelements. The piezoelements can be set into vibration along the longitudinal axis X or can record vibrations along the longitudinal axis X. The piezoelements are connected by means of electrical connections, specifically connection cables, which are not depicted.

To permit the secure transmission of oscillations the drive and reception device 7 is clamped against the back of the rear section 51 of the transitional fastening body 5 by a clamping device 8. The clamping device 8 consists of a rear clamping element 80, which runs perpendicular to the longitudinal axis X at the back of the drive and reception device 7, and consists of at least one fastening bolt 81 and at least one holding or clamping bolt 82. The fastening bolt 81 and the clamping bolt 82 extend from the back through a fastening bolt through-hole 83, or through a clamping bolt through hole 84, both of which run toward the front through the clamping element 80. The fastening bolt through-hole 83 and the clamping bolt through-hole 84 are positioned in such a way that the fastening bolt 81 and the clamping bolt 82 can run toward the front, lateral to and beside the drive and reception device 7. At the back the fastening bolt 81 has a screw head whose diameter is larger than the diameter of the fastening bolt through-hole 83. At the back the clamping bolt 82 has a clamping bolt thread 85, onto which a nut 86 is screwed. The outer diameter of the nut 86 is larger than the diameter of the clamping bolt through-hole 84, so that the clamping element 80 can be clamped against the drive and reception device 7 at the back using the nut 86.

The front end of the fastening bolt 81 projects into a fastening hole 87; this fastening hole 87 runs, at least in part, from the rear into the back section 51 of the transitional fastening element 5 and has an inner thread that matches the fastening bolt thread 88. The fastening bolt 81 is thus designed to directly brace the clamping element 80 against the transitional fastening element 5.

With its front terminal section the clamping bolt 82 projects through a clamping bolt through-hole 89 in the back section 51 of the transitional fastening element 5 and extends up to the diaphragm 61. The diameter of the clamping bolt through-hole 89 is such that the clamping bolt 82 rests at the inner walls of the clamping bolt through-hole 89 without friction and ideally without contact, so that oscillations are not transmitted from the back section 51 to the clamping bolt 82. With its front face 90, the clamping bolt 82 is secured, specifically welded, to the back wall 63 of the diaphragm 61.

With this clamping configuration, oscillations are transmitted directly from the back section of the drive and reception device 7 to the diaphragm 61 by the clamping element 80 and the clamping bolt 82, and by the diaphragm 61 to the outside oscillating body 3. In corresponding fashion oscillations from the outside oscillating body 3 are transmitted in reverse direction to the back section of the drive and reception device 7. Oscillations are directly transmitted from the front section of the drive and reception device 7 to the inner oscillating body 4 by the transitional fastening element 5. Oscillations from the inner oscillating body 4 are directly transmitted in reverse direction to the front section of the drive and reception device 7.

In principle, the gap width b could have a greater magnitude to permit normal operation of the level meter 1. However, limiting the gap width to a maximum value provides special advantages when a lateral displacing force F is at work on the outside oscillating body 3. It is often the case that more bulk material lies on the one side of the terminal section of the outside oscillating body 3, particularly the front terminal section, than on the opposite side. This bulk material creates the displacing force F, which swings the outside oscillating body 3 laterally out of its coaxial position relative to the longitudinal axis X, with the result that the front end of the outside oscillating body 3 is swung laterally in the amount of displacement distance sq. Because of the rigid design of the outside oscillating body 3, this event involves the outside oscillating body 3 in a swinging movement in the area of the diaphragm fastening body 6. In particular, a central and inside section of the diaphragm 61, on the side toward which the displacing force F acts, is displaced backwards by a displacement distance sh. This displacement of the diaphragm 61 in the backward direction means that the clamping bolt 82 is also displaced by distance sh in the backward direction, at the same time as the diaphragm 61. This necessarily causes the back clamping element 80 of the clamping device 8 to disengage. For that case in which the displacing force F is strong, with the result that the displacement distance sh for the diaphragm 61 is large, this would cause the clamping element 80, and at the same the drive and reception device 7, to disengage, thereby disturbing or completely interrupting the transmission of oscillations to and from the drive and reception device 7.

To assure a sufficient clamping force on the drive and reception device 7, the gap width b is therefore kept small enough to guarantee that—given a displacement force F, or a displacement distance sh that is greater than the gap width b—the back wall 63 of the diaphragm 61 will strike the front wall 54 of the rear section 51 belonging to the transitional fastening element 5. By maintaining a minimum gap width b it is thereby assured, on the one hand, that the opposite walls 63, 54 do not strike each other during normal operation. On the other hand, limiting the gap width b guarantees that the two adjacent walls 63, 54 will come into contact before there is an inadmissibly large release of pressure on the drive and reception device 7. Particularly desirable is a clamping width b which is optimized with respect to the highest admissible disengagement, in order to prevent the walls 63, 54 from striking—even in a situation where a small lateral displacing force F, and thus a slight displacement of the diaphragm 61, still permits a sufficient degree of play for reliable operation and without the adjacent walls 63, 54 touching.

This kind of configuration thus prevents a disengagement of the piezo-drive stack of the drive and reception device 7 when the outside oscillating body 3 is encumbered with a medium or bulk material from a lateral direction. This results in a higher load-bearing capability on the part of the oscillating element or oscillating rod in the direction of disengagement. This arrangement advantageously results in disengagement being prevented not only when there is a lateral load on the outside oscillating body 3, but also when there is a load on the outside oscillating body 3 working from the front to the back.

Under conditions in which the filling material is introduced through a hole to side of the level meter 1, a corresponding configuration of the level meter 1 would make it theoretically possible to avoid a displacing force F in an inadmissible direction, i.e., in the direction of the clamping bolt 82,—specifically by allowing the side of the clamping bolt 82 to face the container opening. However, the use of the housing 2 with the conventional screw-in thread 20 makes such an orientation possible to only a limited degree. In the ideal case, this orientation could be completely omitted by specifying a suitable gap width b.

In the case of a stronger displacing force F the plastic deformation of the diaphragm 61 may occur if the latter is displaced by a maximally admissible displacement distance sh. By making the gap width b smaller than this maximally admissible displacement path sh, the plastic deformation of the diaphragm 61 can be avoided. When the displacing force F is removed the diaphragm 61 elastically springs back and frees the gap s and its maximal gap width b. The gap s will advantageously have a circular design and will thus prevent overloading in all directions, i.e., including when the oscillating body 3 is encumbered in an axial, rearwards direction. Steel is particularly preferred as a material for the individual components, particularly the diaphragm 61. By suitably combining materials for the diaphragm 61 it is possible to further improve the tension admissible for the diaphragm 61 in correspondence with the maximum gap width b and with regard to the diaphragm's elastic properties.

Establishing the gap width b thus limits the distance of movement or of disengagement on the part of the clamping device—a distance by means of which the diaphragm 61 and the drive and reception 7 are braced together in such a way that the drive and reception 7 is clamped at the back against the transitional element 5, 51.

LIST OF REFERENCE NUMERALS 1 level meter
2 housing
20 screw-in thread
21 interior of 2
3 outside oscillating body
30 interior of 3
4 inner oscillating body
40 interior of 4
5 transitional fastening body
51 back section of 5
52 front section of 5
53 narrow portion of 5

54 front wall of 51
6 diaphragm fastening body for 3 to 5
60 front section of 6
61 diaphragm
62 fastening collar of 6
63 back wall of 61
7 drive and reception device
8 clamping device
80 clamping element for 7
81 fastening bolt
82 clamping bolt
83 fastening bolt through-hole in 80
84 clamping bolt through-hole in 80
85 clamping bolt thread
86 nut
87 fastening hole in 51 for 81
88 fastening bolt thread
89 clamping bolt through-hole in 51
90 front of clamping
X longitudinal axis
F displacing force
sq lateral displacement path or distance
sh displacement path for 61
s gap between 63 and 54
b gap width of s
d radius of 61

The invention claimed is:

1. A level meter (1) with
an initial, and specifically outside, oscillating body (3) and
a second, and specifically inner, oscillating body (4), which bodies (3, 4) are coaxially positioned relative to a longitudinal axis (X),
a drive and reception device (7) for exciting an oscillation in the oscillating bodies (3, 4), and
a diaphragm (61) for elastically coupling one of the oscillating bodies (3), such that the diaphragm (61), on its side facing away from the oscillating bodies (3, 4), rests above a gap (s) that is positioned at a distance from a transitional element (5),
wherein
the gap (s) is small enough so that if the diaphragm (61) is dislocated by a given distance the diaphragm (61) will come up against the transitional element (5).

2. A level meter (1) with
an outer oscillating body (3) and
an inner oscillating body (4), which bodies are coaxially positioned relative to a longitudinal axis (X),
a drive and reception device (7) for exciting an oscillation in the oscillating bodies (3, 4) or for detecting an oscillation in the oscillating bodies (3, 4),
a diaphragm (61) for elastically coupling one of the oscillating bodies (3), and
a clamping device (8) for clamping the drive and/or reception device (7), against the oscillating bodies,
wherein
the diaphragm (61), runs in a lateral direction relative to the longitudinal axis (X) of the outer oscillating body (3) and on the outside passes into a transitional element (5, 51),
the transitional element (5) is positioned between the drive and/or reception device (7) and the inner oscillating body (4) for the purpose of transmitting the oscillations between the drive and/or reception device (7) and the inner oscillating body (4), and one wall of the transitional element (5) runs in a lateral direction adjacent to the diaphragm,
the clamping device (8) fastens together the diaphragm (61) and the drive and/or reception device (7) in such a way that the drive and/or reception device (7) is clamped against the transitional element (5, 51), and
a gap (s) lies between the adjacent walls (63, 54) of the diaphragm (61) and of the transitional element (51).

3. A level meter according to claim 2, in which the clamping device (8) exhibits a clamping bolt (82) which runs from the diaphragm (61) to a clamping element (80), and at the back this clamping element (80) is clamped against the drive and/or reception device (7) in such a way that the drive and/or reception device (7) is braced at the front against the inner oscillating body (4) and is braced at the back in a position facing the outer oscillating body (3).

4. A level meter according to claim 3, in which the clamping bolt (82) runs through a clamping bolt through-hole (89) in the transitional element (51).

5. A level meter according to claim 1, in which the gap (s) has a gap width (b) whose dimensions are such that a displacing force (F) exerted laterally on the outside oscillating body (3) swings the outside oscillating body (3) in a lateral direction and thereby presses the wall (63) of the diaphragm (61) toward the gap (s) and against the adjacent wall (54) of the transitional element (51).

6. A level meter according to claim 5, in which the gap width (b) has dimensions such that the wall (63) of the diaphragm (61) comes to rest against the wall (54) of the transitional element (5, 51) before there is plastic deformation of the diaphragm (61).

7. A level meter according to claim 5, in which the gap width (b) has dimensions such that the wall (63) of the diaphragm (61) comes to rest against the wall (54) of the transitional element (5, 51) before the clamping device (8), specifically a clamping bolt (82) and a clamping element (80) belonging to the clamping device (8), disengages the drive and/or reception device (8) at the back to a degree such that the transmission of oscillations between the drive and/or reception device (7) and at least one of the oscillating bodies (3, 4) is interrupted and/or disturbed.

8. A level meter according to claim 5, in which the gap width (b) is smaller than or equal to 3 mm, specifically smaller than or equal to 2 mm.

9. A level meter according to claim 5, in which the ratio between the gap width (b) and the radius of the diaphragm (61) is smaller than or equal to 1:45, specifically smaller than or equal to 1:72.

10. A level meter according to claim 1, in which the configuration of the diaphragm (61) and/or the gap (s) has a cylindrically symmetrical, circular design around the longitudinal axis (X).

* * * * *